Patented Apr. 29, 1952

2,594,859

UNITED STATES PATENT OFFICE 2,594,859

METHOD OF DELAYING COAGULATION OF RUBBER LATEX

Robert E. Boyd, George H. McFadden, and Bailey Bennett, Columbus, Ohio, assignors, by mesne assignments, to General Motors Corporation, Detroit, Mich., a corporation of Delaware No Drawing. Application January 5, 1950, Serial No. 137,029

17 Claims. (Cl. 260—723)

This invention relates to foamed latex and to methods for manufacturing such latex.

It is the basic object of the invention to provide a combination of reagents to control gelation in foamed latices.

A further object of the invention is to provide a method for retarding gelation and/or preventing gelation of foamed latices after the gelling agent has been added thereto.

A still further object of the invention is to provide a method for retarding or preventing gelation of foamed latices wherein sodium, potassium or ammonium fluotitanates have been used as the gelling agents.

A still further object of the invention is to provide a combination of reagents wherein sodium, potassium, or ammonium fluotitanates or for that matter any other soluble monovalent alkali fluotitanate is used as a gelling agent, and wherein additions of monovalent alkali hydroxides including ammonium hydroxide are added for controlling the period required for gelation to take place or for preventing gelation.

Another object of the invention is to provide a method and combination of reagents for re-initiating the gelation process after the same has been arrested by the addition of one of the monovalent alkali hydroxides.

Further objects and advantages of the present invention will be apparent, reference being had to the accompanying description which follows:

In the manufacture of articles from latex foam, it is the usual practice to foam the latex by beating or other suitable means to a condition of greatly expanded volume wherein the compounding ingredients may be added to the latex prior to the beating or during the beating. This foamed latex is next activated by the addition of a gelling agent; the quantity of the specific gelling agent used causing gelation of the foamed latex in a predetermined period of time. Prior to gelation of the foam and subsequent to the addition of the gelling agent the latex foam is usually placed in molds so that upon gelling the molded material may be cured under suitable conditions to form an article of spongy character and resilient nature. Any of the well known latices may be used in the foaming operation, such as natural rubber, polychloroprene and butadiene-styrene copolymers, butadiene-acrylonitrile copolymers, mixtures thereof and, in fact, any of the latices disclosed in McFadden patent, No. 2,472,054, which lists a number of butalastic polymers and mixtures thereof such as are fully defined in the book "Butalastic Polymers, a Treatise on Synthetic Rubbers" by Marchionna.

Broadly speaking, natural rubber, polychloroprene, butadiene-styrene copolymer, etc., and any of the butalastic polymers that include a single ethylenic double bond >C=C< which are copolymerizable with butadiene 1,3 in aqueous emulsion, may be used. In any event, the specific latex used in the present invention is of no great importance providing such latex may be compounded, foamed and gelled. The latex after foaming may have added thereto one of the specific gelling agents noted in patent, No. 2,472,054 and specifically the soluble monovalent alkali fluotitanates including ammonium fluotitanate. It is to be understood therefore that when the soluble monovalent alkali fluotitanates are mentioned hereinafter that such a grouping includes ammonium fluotitanate.

Sodium, potassium and ammonium fluotitanate make up the more common soluble monovalent fluotitanic acid salts in the alkali group. These may be added in varying amounts to a latex foam and will cause satisfactory gelation within a predetermined period of time. In this connection, the pH of the latex is a controlling factor on time and in the examples which follow a polychloroprene latex having a pH value of 9.3 was used for illustrative purposes only. However, the same general pattern given with respect to the polychloroprene latex will follow with any of the other latices mentioned providing chemically equivalent additions of the materials hereinafter noted are added.

In the manufacture of foamed rubberlike articles in production, there is always a problem of arresting gelation for predetermined periods of time in order to make necessary repairs to the production line, etc. It is apparent that once the gelling agent, namely, the fluotitanates mentioned, has been added to the foam, that the foam must be molded quickly (within a period of minutes, usually 5-15 minutes) or it will become gelled in the storage tank. Plants manufacturing foam products operate on either a batch or a continuous process wherein the quantity of foamed latex to which gelling agent is added, is maintained in rather small quantities. Even then shut-downs in the production line require loss of this small quantity of latex if no means are provided for arresting gelation of the latex. We have found that when using soluble monovalent alkali fluotitanates as gelling agents that the action thereof may be delayed or completely arrested by the addition of varying amounts of the alkali hydroxides including ammonium, specifically sodium, potassium and ammonium hydroxides are the most desirable. We have found that addition of any of these hydroxides to latex foam which includes a soluble monovalent alkali fluotitanate therein, in an amount chemically equivalent to the fluotitanate used, is a maximum addition necessary to completely arrest gelation. Smaller quantities than chemically equivalent amounts of the alkali hydroxide will cause a slowing up or delay of the gelling action. Thus it is best to arrive at the quantity of addition to be used by trial, scaling down from a chemically equivalent quantity. In general 0.4 to 0.5 of a mole of the hydroxide per mole of fluotitanate salt used will produce satisfactory delays under the usual conditions of temperature, for example, 22° C. In this connection, it is apparent that as the ambient temperature varies, the period of delay will also vary which, in some measure, will control the quantity of hydroxide to be added. In Table I which follows, normal gelling times for different fluotitanates in varying quantities are noted when used in connection with a polychloroprene 601 foam having a pH of 9.3. As noted before, this latex is being used for illustrative purposes only and similar tables have been obtained when using other types of latices.

TABLE I

*Normal gelling time through use of fluotitanates*

| Gelling agent | Moles of gelling agent used per 200 gms. Neoprene 601 Latex | Gelling time 22° C. (Minutes) |
|---|---|---|
| Na$_2$TiF$_6$ | 0.005 | 21 |
| Na$_2$TiF$_6$ | 0.0075 | 14 |
| Na$_2$TiF$_6$ | 0.01 | 6½ |
| Na$_2$TiF$_6$ | 0.02 | 4 |
| Na$_2$TiF$_6$ | 0.03 | 1¼ |
| Na$_2$TiF$_6$ | 0.04 | ¾ |
| K$_2$TiF$_6$ | 0.018 | 40 |
| K$_2$TiF$_6$ | 0.036 | 14 |
| (NH$_4$)$_2$TiF$_6$ | 0.02 | 5 |

Table II gives figures for the delay of gelation by the addition of varying quantities of different alkali hydroxides. It will be noted that in each case, the addition of hydroxides changes the time of gelation and, in some cases prevents it entirely in which instance the ratio of hydroxide-fluotitanate is in the order of a chemically equivalent amount.

TABLE II

*Delay of fluotitanate gelation by addition of alkali*

| Gelling agent | Moles gelling agent used per 200 gms. latex | Moles alkali used per 200 gms. latex | Molar ratio of fluotitanate to alkali | Time of gelation (Minutes) 22° C. |
|---|---|---|---|---|
| Na$_2$TiF$_6$ | 0.01 | 0.005 KOH | 1:0.5 | 43 |
| Na$_2$TiF$_6$ | 0.01 | 0.01 KOH | 1:1 | 56 |
| Na$_2$TiF$_6$ | 0.01 | 0.02 KOH | 1:2 | 88 |
| Na$_2$TiF$_6$ | 0.01 | 0.03 KOH | 1:3 | (¹) |
| Na$_2$TiF$_6$ | 0.01 | 0.04 KOH | 1:4 | (²) |
| Na$_2$TiF$_6$ | 0.04 | 0.04 KOH | 1:1 | 24 |
| Na$_2$TiF$_6$ | 0.04 | 0.04 NaOH | 1:1 | 25 |
| K$_2$TiF$_6$ | 0.036 | 0.009 KOH | 1:¼ | 55 |
| K$_2$TiF$_6$ | 0.036 | 0.072 KOH | 1:2 | (²) |
| K$_2$TiF$_6$ | 0.036 | 0.072 NaOH | 1:2 | (²) |
| K$_2$TiF$_6$ | 0.036 | 0.009 NH$_4$OH | 1:¼ | 50 |
| (NH$_4$)$_2$TiF$_6$ | 0.02 | 0.02 KOH | 1:1 | (¹) |

¹ Surface only at 120 minutes.
² None at 120 minutes.

When using ammonium hydroxide care must be taken to prevent loss thereof due to volatility. Otherwise the addition is quite satisfactory. The differences in time of gelation for different fluotitanates noted is explained by the fact that the solubilities of the various salts vary and therefore a more effective amount of fluotitanate is present in the case of ammonium fluotitanate than in the case of sodium or potassium fluotitanate which latter salts are less soluble than the ammonium salt. In all cases, however, proper quantities of additions will provide satisfactory results.

In order to re-initiate gelation after the addition of the alkali hydroxide, it is merely necessary to add additional fluotitanate to the foam and unless chemically equivalent amounts of hydroxide were used, this addition does not necessarily have to be in as large a quantity as the first addition of the gelling agent since some effective gelling agent still remains in the foam. In all cases, however, it is highly desirable to make test runs on the specific latex foam being used wherein the pH, temperature, specific gelling agent, etc., all have effect on the time operation. Therefore, when the production set up is complete, check runs may be made in order to obtain data for subsequent use for delaying the action of the gelling agent.

While the embodiments of the present invention as herein disclosed, constitute preferred forms, it is to be understood that other forms might be adopted.

What is claimed is as follows:

1. The method of delaying coagulation of normally alkaline foamed latex material having incorporated therein a soluble monovalent alkali fluotitanate salt as a gelling agent, that step of adding a monovalent alkali hydroxide to the foam in quantities not in excess of chemically equivalent amounts of the fluotitanate salt used whereby the action of fluotitanate salt is delayed.

2. Arrested latex foam comprising, in combination, normally alkaline foamed latex having therein a soluble monovalent alkali fluotitanate as a gelling agent in quantities ranging from 0.5% to 4% and a monovalent alkali hydroxide in quantities of not more than a chemically equivalent amount to the fluotitanate used whereby gelation of the foam by the fluotitanate is arrested.

3. The method of delaying coagulation of normally alkaline foamed latex material having incorporated therein a soluble monovalent alkali fluotitanate salt as a gelling agent, that step of adding sodium hydroxide to the foam in quantities not in excess of chemically equivalent amounts of the fluotitanate salt used whereby action of fluotitanate salt is delayed.

4. The method of delaying coagulation of normally alkaline foamed latex material having incorporated therein a soluble monovalent alkali fluotitanate salt as a gelling agent, that step of adding potassium hydroxide to the foam in quantities not in excess of chemically equivalent amounts of the fluotitanate salt used whereby the action of fluotitanate salt is delayed.

5. The method of delaying coagulation of normally alkaline foamed latex material having incorporated therein a soluble monovalent alkali fluotitanate salt as a gelling agent, that step of adding ammonium hydroxide to the foam in quantities not in excess of chemically equivalent amounts of the fluotitanate salt used whereby the action of fluotitanate salt is delayed.

6. The method of delaying coagulation of normally alkaline foamed latex material having incorporated therein sodium fluotitanate as a gelling agent, that step of adding alkali hydroxide to the foam in quantities not in excess of chemically equivalent amounts of the fluotitanate salt used whereby the action of fluotitanate salt is delayed.

7. The method of delaying coagulation of normally alkaline foamed latex material having incorporated therein potassium fluotitanate as a gelling agent, that step of adding alkali hydroxide to the foam in quantities not in excess of chemically equivalent amounts of the fluotitanate salt used whereby the action of fluotitanate salt is delayed.

8. The method of delaying coagulation of normally alkaline foamed latex material having incorporated therein ammonium fluotitanate as a gelling agent, that step of adding alkali hydroxide to the foam in quantities not in excess of chemically equivalent amounts of the fluotitanate salt used whereby the action of fluotitanate salt is delayed.

9. The method of delaying coagulation of normally alkaline foamed latex material having incorporated therein potassium fluotitanate as a gelling agent, that step of adding sodium hydroxide to the foam in quantities not in excess of chemically equivalent amounts of the fluotitanate salt used whereby the action of fluotitanate salt is delayed.

10. The method of delaying coagulation of normally alkaline foamed latex material having incorporated therein potassium fluotitanate as a gelling agent, that step of adding potassium hydroxide to the foam in quantities not in excess of chemically equivalent amounts of the fluotitanate salt used whereby the action of fluotitanate salt is delayed.

11. The method of delaying coagulation of normally alkaline foamed latex material having incorporated therein potassium fluotitanate as a gelling agent, that step of adding ammonium hydroxide to the foam in quantities not in excess of chemically equivalent amounts of the fluotitanate salt used whereby the action of fluotitanate salt is delayed.

12. The method of delaying coagulation of normally alkaline foamed latex material having incorporated therein sodium fluotitanate as a gelling agent, that step of adding sodium hydroxide to the foam in quantities not in excess of chemically equivalent amounts of the fluotitanate salt used whereby the action of fluotitanate salt is delayed.

13. The method of delaying coagulation of normally alkaline foamed latex material having incorporated therein sodium fluotitanate as a gelling agent, that step of adding potassium hydroxide to the foam in quantities not in excess of chemically equivalent amounts of the fluotitanate salt used whereby the action of fluotitanate salt is delayed.

14. The method of delaying coagulation of normally alkaline foamed latex material having incorporated therein sodium fluotitanate as a gelling agent, that step of adding ammonium hydroxide to the foam in quantities not in excess of chemically equivalent amounts of the fluotitanate salt used whereby the action of fluotitanate salt is delayed.

15. The method of delaying coagulation of normally alkaline foamed latex material having incorporated therein ammonium fluotitanate as a gelling agent, that step of adding sodium hydroxide to the foam in quantities not in excess of chemically equivalent amounts of the fluotitanate salt used whereby the action of fluotitanate salt is delayed.

16. The method of delaying coagulation of normally alkaline foamed latex material having incorporated therein ammonium fluotitanate as a gelling agent, that step of adding potassium hydroxide to the foam in quantities not in excess of chemically equivalent amounts of the fluotitanate salt used whereby the action of fluotitanate salt is delayed.

17. The method of delaying coagulation of normally alkaline foamed latex material having incorporated therein ammonium fluotitanate as a gelling agent, that step of adding ammonium hydroxide to the foam in quantities not in excess of chemically equivalent amounts of the fluotitanate salt used whereby the action of fluotitanate salt is delayed.

ROBERT E. BOYD.
GEORGE H. McFADDEN.
BAILEY BENNETT.

REFERENCES CITED

The following references are of record in the file of this patent:

UNITED STATES PATENTS

| Number | Name | Date |
|---|---|---|
| 2,313,464 | Clayton | Mar. 9, 1943 |
| 2,321,111 | Stamberger | June 8, 1943 |
| 2,472,054 | McFadden | May 31, 1949 |